United States Patent

[11] 3,579,791

| [72] | Inventor | Richard B. Arnold<br>Fort Wayne, Ind. |
|---|---|---|
| [21] | Appl. No. | 884,145 |
| [22] | Filed | Dec. 11, 1969 |
| [45] | Patented | May 25, 1971 |
| [73] | Assignee | General Electric Company<br>Continuation-in-part of application Ser. No.<br>748,406, July 29, 1968. |

[54] COIL DEVELOPING APPARATUS
13 Claims, 15 Drawing Figs.

[52] U.S. Cl. .................................................. 29/205,
29/596, 29/605, 29/606, 140/92.1, 242/7.09,
242/7.13
[51] Int. Cl. ..................................................... H02k 15/00
[50] Field of Search .......................................... 29/605,
606, 596, 205; 242/82, 7.09, 7.13; 140/92.1

[56] References Cited
UNITED STATES PATENTS

| 2,432,267 | 12/1947 | Adamson | 29/205 |
|---|---|---|---|
| 2,836,204 | 11/1955 | Mason | 242/7.09(X) |
| 2,934,099 | 4/1960 | Mason | 140/92.1 |
| 3,097,812 | 7/1963 | Nye et al. | 242/82 |
| 3,151,638 | 10/1964 | Hill | 140/92.1 |
| 3,415,292 | 12/1968 | Ericson | 140/92.1 |
| 3,481,372 | 12/1969 | Eminger et al. | 140/92.1 |

*Primary Examiner*—John F. Campbell
*Assistant Examiner*—Carl E. Hall
*Attorneys*—John M. Stoudt, Radford M. Reams, Ralph E. Krisher, Jr., Frank L. Neuhauser and Oscar B. Waddell

ABSTRACT: Apparatus for developing one or more coil groups of electrically conductive wire. The apparatus includes a coil turn-forming assembly having a jump form portion and a snap out form portion. The jump form portion includes a plurality of turn-gauging steps with an interruption formed at one side. The snap out form portion is supported adjacent to the interruptions on the turn-gauging steps and includes a corresponding number of snap out winding form plates, each having a fill-in winding section for spanning one of the associated interruptions on the jump form portion.

The apparatus also includes a flyer for placing wire on the coil turn-forming assembly to generate turns and a jump means for locating a turn-gauging step of the jump form portion in the path of the wire being wound by the flyer. Concurrently, as the jump means locates a turn-gauging step in the path of the wire wound by the flyer, a snap out plate is extended to place a fill-in winding section in alignment with its associated interruption of a turn-gauging step. The turn-gauging step of the jump form portion and its associated fill-in winding section cooperate to provide a form for winding or generating turns of a predetermined length for receipt in a coil group accommodating means or device. Preferably, the coil group accommodating means is comprised of spaced curved blades defining turn receiving slots. The spaced curved blades and corresponding fill-in winding sections of the snap out plates have associated mating curved surfaces whereby, when a snap out plate is engaged with a curved blade, the entry of the turns of a coil being generated into the corresponding turn receiving slot is facilitated by the mating curved surfaces. Thus each coil is developed directly in the coil group accommodating means as the turns for the coil are generated about the coil turn-forming assembly. Also, the jump form portion and the snap out plates may be supported for movement in essentially a vertical direction, and the curved blades are supported in alignment with the snap-out plates so that the force of gravity facilitates the removal of the turns from the coil form assembly.

Additionally at least part of the jump form portion is movable relative to the snap out portion during the turn-generating operation for selectively varying the lengths of successive turns.

A coil group is developed in the coil group accommodating means by producing a plurality of serially connected wound coils of a coil group in the coil group accommodating means. Thereafter the coil group may be inserted directly from the coil group accommodating means into preselected slots of a stator core.

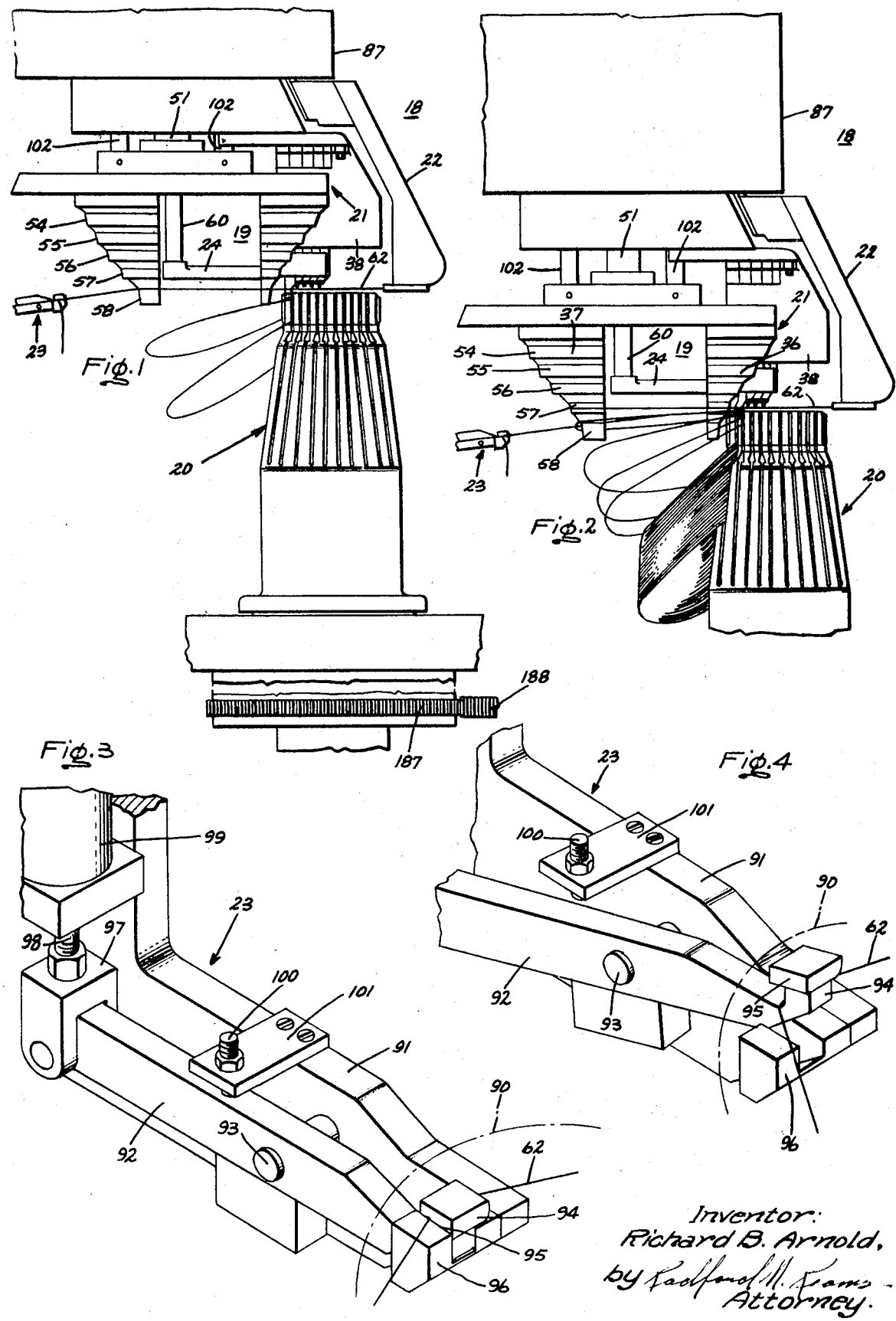

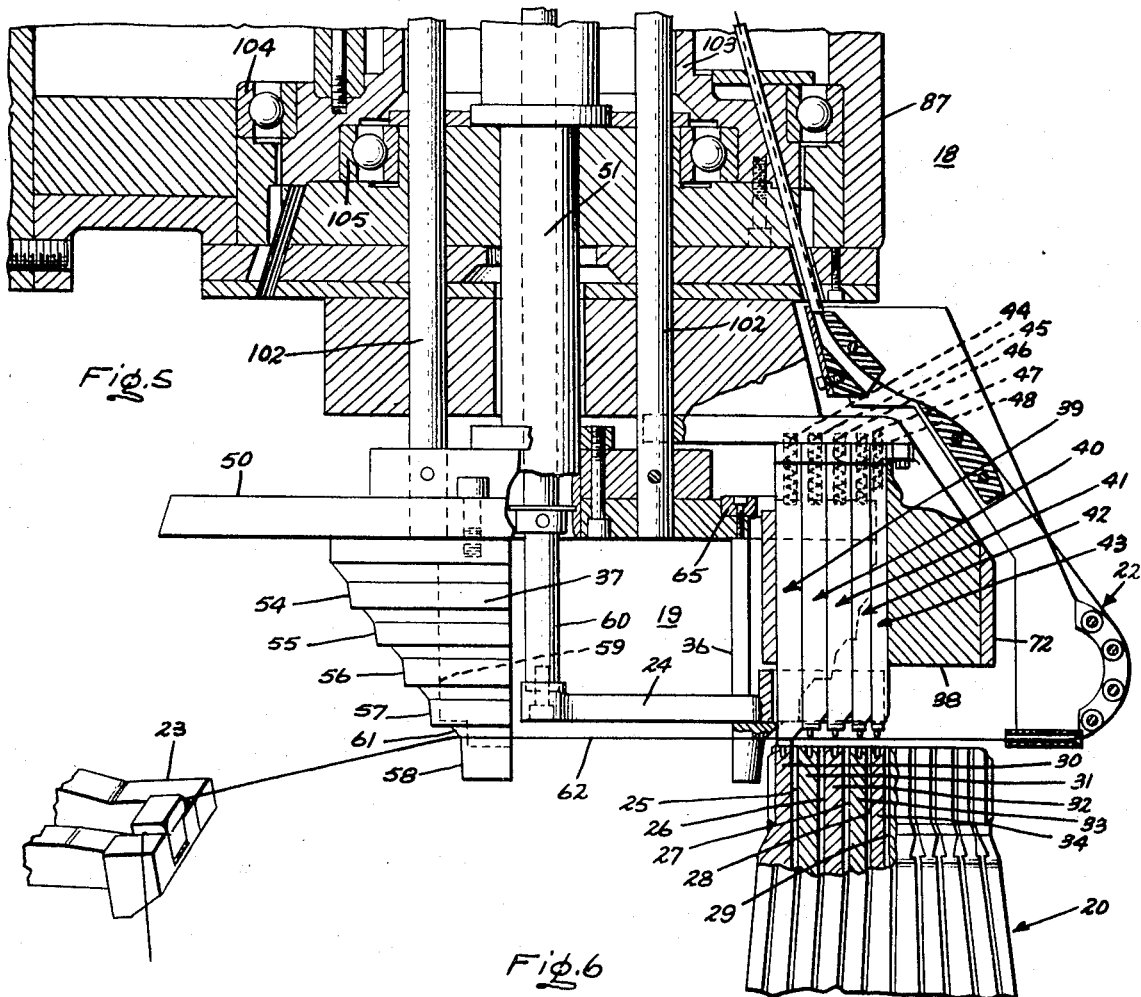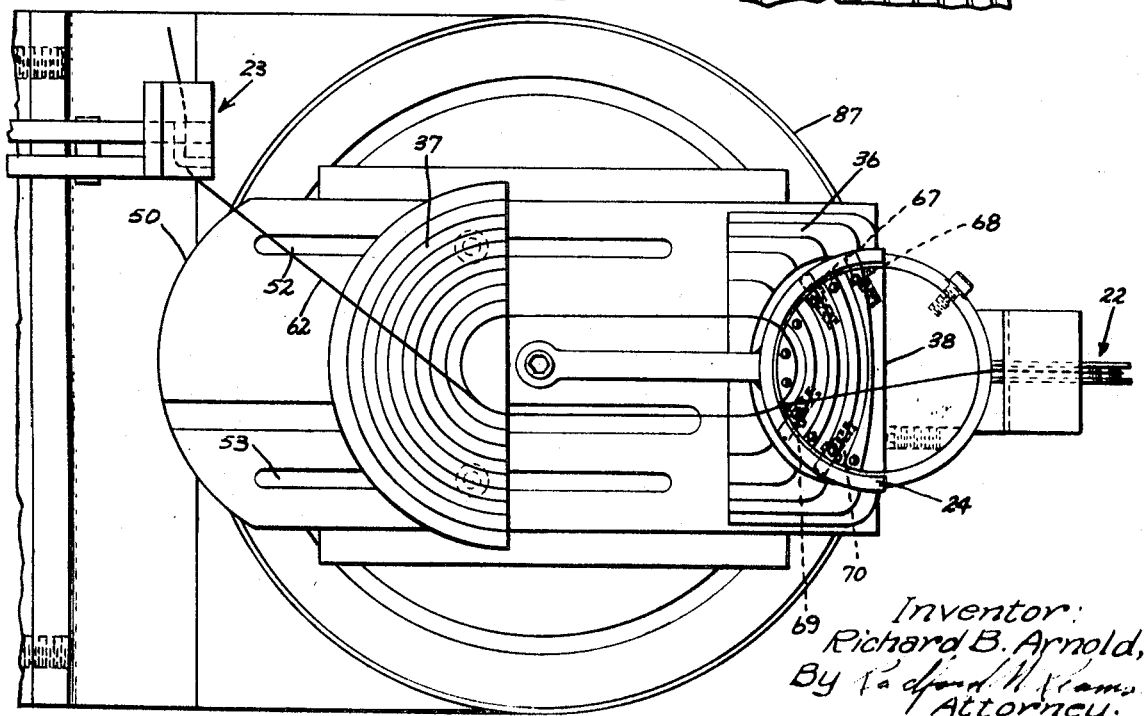

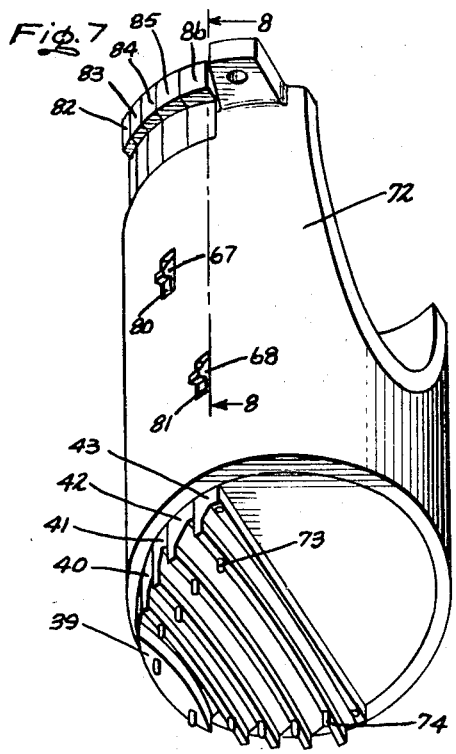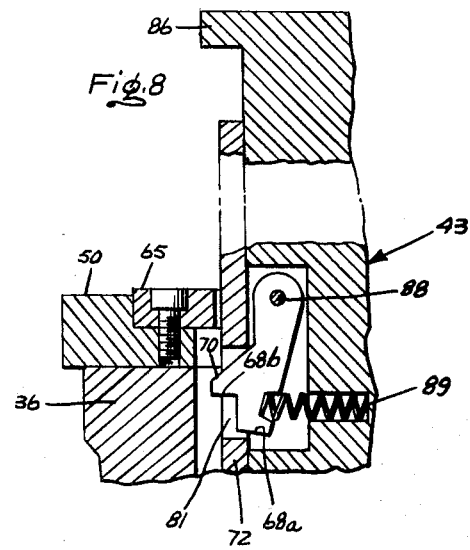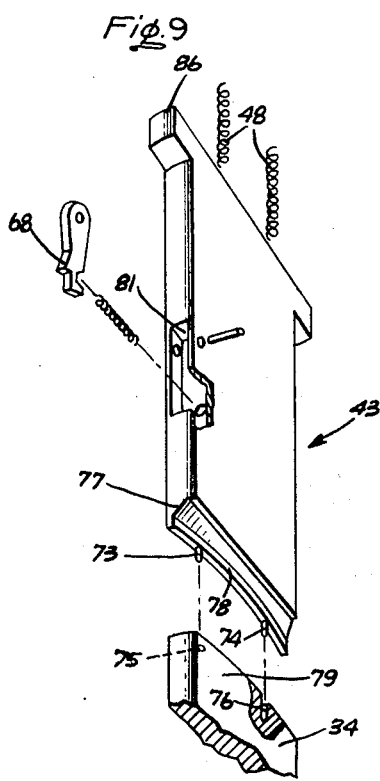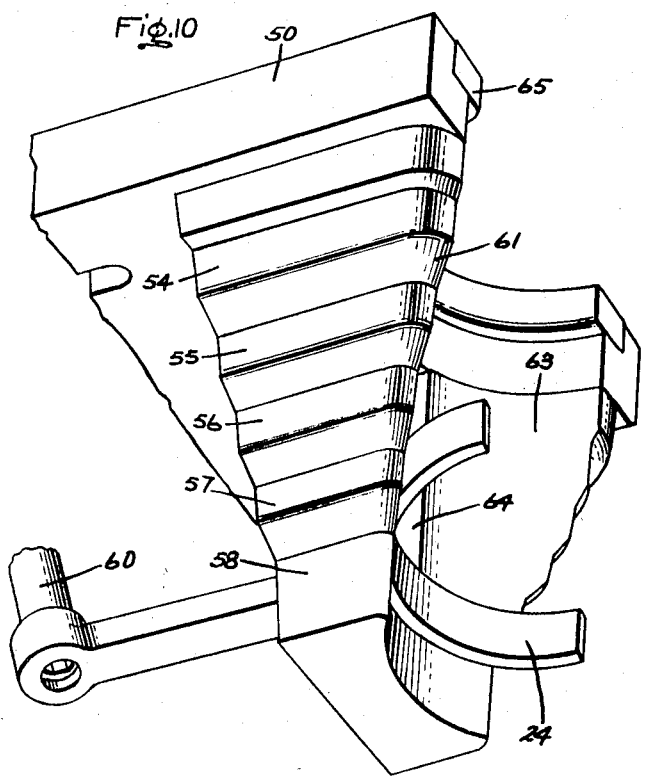

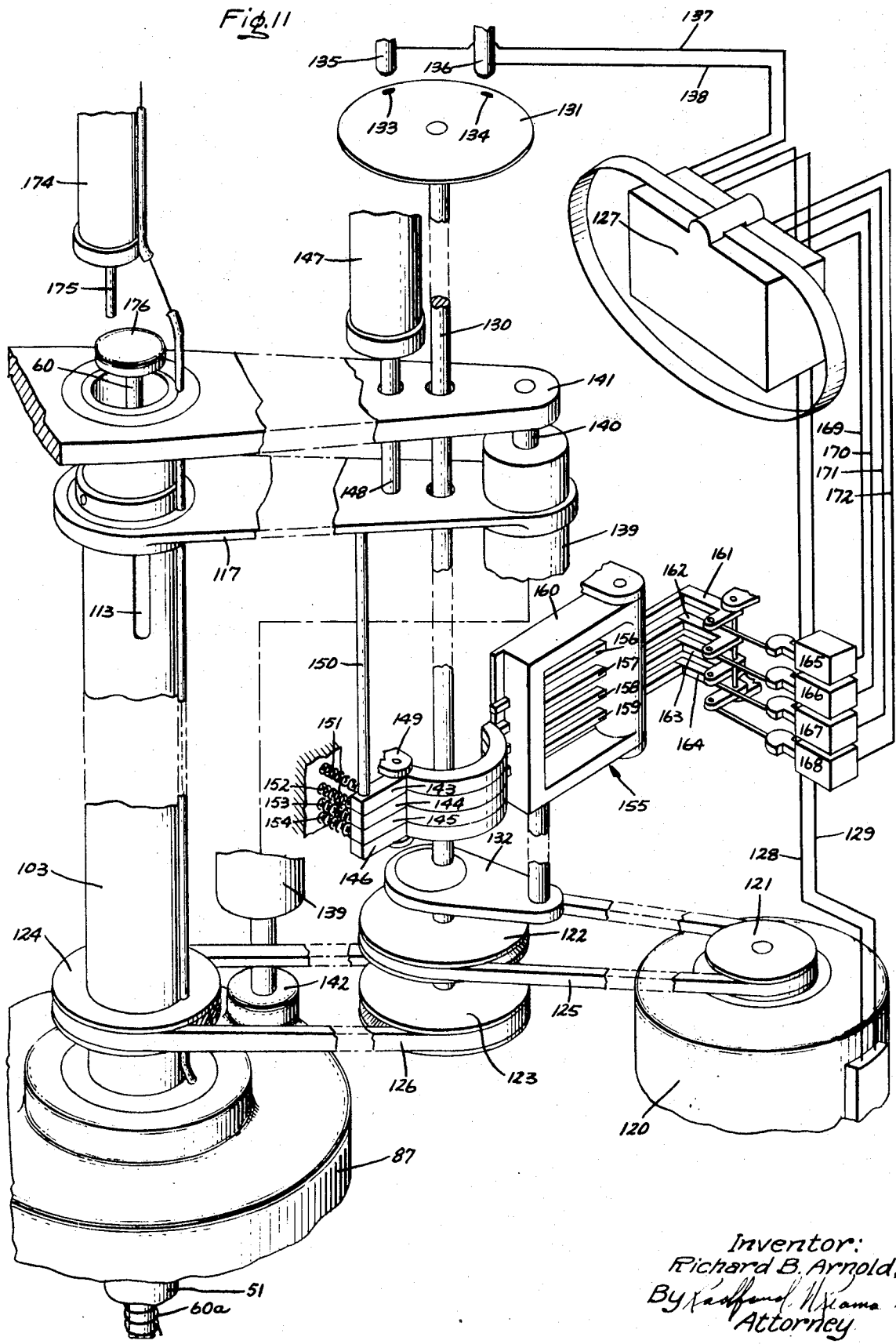

INVENTOR.
Richard B. Arnold,
BY Radford M. Reams
Attorney.

INVENTOR.
Richard B. Arnold,
BY Radford M. Reams
Attorney.

3,579,791

COIL DEVELOPING APPARATUS

CROSS-REFERENCE TO RELATED APPLICATION

This application is a continuation-in-part of my application, Ser. No. 748,406 filed July 29, 1968, now abandoned.

BACKGROUND OF THE INVENTION

This invention relates generally to apparatus for developing wound coils for use in electromagnetic devices. More particularly, the invention relates to apparatus for developing coils of electrically conductive wire for use in a stator member of a dynamoelectric machine such as a motor.

Conventionally, the coils for a particular coil group of the stator of a dynamoelectric machine, such as a motor, are wound on a collapsible arbor type of winding machine. In this kind of machine, after coils for the particular coil group have been wound on the arbor, the arbor is collapsed into a smaller cross-sectional configuration to permit removal of the coils from the winding machine. The coils are removed by hand, taped or clipped and in one approach are subsequently inserted by hand into a coil group accommodating means or device such as a coil injection machine or tooling, which in turn, insert the coils into the desired slots of an electromagnetic device such as a stator. Although machines have been proposed for mechanically transferring the windings from coil winding equipment to coil injection tooling, the combined operations are still time consuming, costly and have not achieved the desired level of production efficiency.

There is a need therefore for a coil developing apparatus wherein the coils of a coil group can be developed in the coil injection tooling, or other coil group accommodating device such as a transfer mechanism without requiring a collapsible arbor. Also, it is particularly desirable that such an apparatus be readily adapted for use with an indexing turntable arbor or other conveyor such as an in-line type of production operation.

Accordingly, it is a general object of my invention to provide an improved apparatus for developing coils for use in an electromagnetic device.

A more specific object of the present invention is to provide an improved apparatus for developing at least one coil group directly into a coil injection tooling or other coil group accommodating device that does not require a collapsible arbor.

It is still another object of the present invention to provide an improved apparatus for developing at least one coil directly into coil injection tooling or other coil group accommodating device, which apparatus may selectively vary the lengths of successive turns of the coil.

A further object of my invention is to provide an improved apparatus for developing a coil group for a dynamoelectric machine, such as an electric motor, that is readily adapted for use in a turntable or other conveyor means, such as in an in-line type of production operation.

SUMMARY OF THE INVENTION

In accordance with one form of my invention, I have provided an apparatus for developing a coil group of electrically conductive wire which includes a noncollapsible coil turn-forming assembly having a jump form portion and a snap out form portion. The jump form portion is formed with a plurality of turn-gauging steps, and the snap out form portion has a plurality of snap out winding form plates with fill-in winding sections corresponding to the turn-gauging steps of the jump form portion. Further, the apparatus includes a winding means for generating turns of wire about the coil turn-forming assembly. A coil group accommodating means or device is supported adjacent to the snap out form portion of the coil turn-forming assembly. Means are provided for successively locating the turn-gauging steps of the jump form portion in the path of the wire being placed by the winding means and for successively releasing the snap out winding form plates to position corresponding fill-in winding sections in engagement with the coil group accommodating means and in the path of the wire generating the turns. Thus, one of the turn-gauging steps of the jump form portion and one of the fill-in winding sections of the snap out plates cooperate to provide a form for generating turns of a predetermined length for one coil of the coil group.

According to a more specific aspect of the invention, at least one of the snap out winding form plates is spring biased to an extended position and latched in a retracted position. Also, a means is included for releasing the snap out winding form plate from its latched position as a corresponding turn-gauging step of the jump form portion is located in the path of the wire being wound by a winding means such as a flyer. Preferably, the coil group accommodating means includes a plurality of spaced curved blades that define turn receiving slots. The curved blades are supported in an essentially vertical position, and one of the snap out winding form plates when in the extended position engages one of the curved blades to complete a turn-gauging step in the path of the wire for generating turns of a predetermined length and for guiding these turns into the turn receiving slots of the coil group accommodating means during the turn-generating operation. Thus the coil is formed directly in the coil group accommodating means. The jump form portion and the snap out winding form plates are also preferably supported for movement in an essentially vertical direction, and the curved blades of the coil group accommodating means are supported in alignment with the snap out winding form plates whereby the force of gravity facilitates the removal of turns from the coil form assembly when one of the snap out plates engages its associated curved blade. Also at least part of the jump form portion is movable relative to the snap out form portion during the turn-generating operation for selectively varying the lengths of successive turns.

One important advantage of the present invention is that it is possible to develop the coils of two or more coil groups efficiently in a coil group accommodating means, such as coil injection tooling, using only one coil turn-forming assembly, from which the coil groups may be inserted directly into the slots of a stator core or other slotted structure. Thus, savings in labor, equipment, costs, and time are readily obtained with the present invention as well as a reduction in the tendency of the turns to cross over one another as the coils are being developed into the slots of the slotted structure.

Another advantage of the improved arrangement is that the coil group accommodating means can be readily positioned with respect to the coil turn-forming assembly by a simple horizontal movement, as for example, by indexing a turntable or moving the coil group accommodating means on a conveyor or other means.

The subject matter which I regard as my invention is particularly pointed out and distinctly claimed in the concluding portion of the specification. The invention itself, however, together with further objects and advantages thereof, may be best understood by reference to the following description taken in conjunction with the accompanying drawings.

BRIEF DESCRIPTION OF THE DRAWINGS

In the drawings:

FIG. 1 is a side elevational view of the winding head and coil group accommodating means of the coil developing apparatus embodying one form of my invention and illustrating the noncollapsible coil turn-forming assembly in the initial position for winding a first coil into the coil group accommodating means;

FIG. 2 is a view corresponding to the view shown in FIG. 1 wherein the coil turn-forming assembly is shown with a second turn-gauging step in the path of the wire being wound by the flyer;

FIG. 3 is an enlarged perspective view of the wire cutoff and holding device shown in the hold position;

FIG. 4 is an enlarged fragmentary view shown in perspective corresponding to the view shown in FIG. 3 wherein the wire cutoff and holding device is shown in the open position;

FIG. 5 is an enlarged side elevational view corresponding to the views shown in FIGS. 1 and 2, partially sectionalized to show the various parts thereof;

FIG. 6 is a bottom plan view of the coil turn-forming assembly shown in FIG. 5 without any sectionalization of the parts and without the coil group accommodating means being shown;

FIG. 7 is a view in perspective of the snap out form portion of the coil turn-forming assembly;

FIG. 8 is a partial sectional view through one of the snap out winding form plates and through a portion of the snap out form portion housing, illustrating the latch pawl mechanism of the snap out winding form plates;

FIG. 9 is a view in perspective of a snap out plate with the latch pawl mechanism shown in an exploded view;

FIG. 10 is a view in perspective of the midform section of the coil turn-forming assembly and the stripper;

FIG. 11 is a simplified schematic diagram in perspective of the drive and control assembly;

DESCRIPTION OF THE PREFERRED EMBODIMENTS

Figure 13:
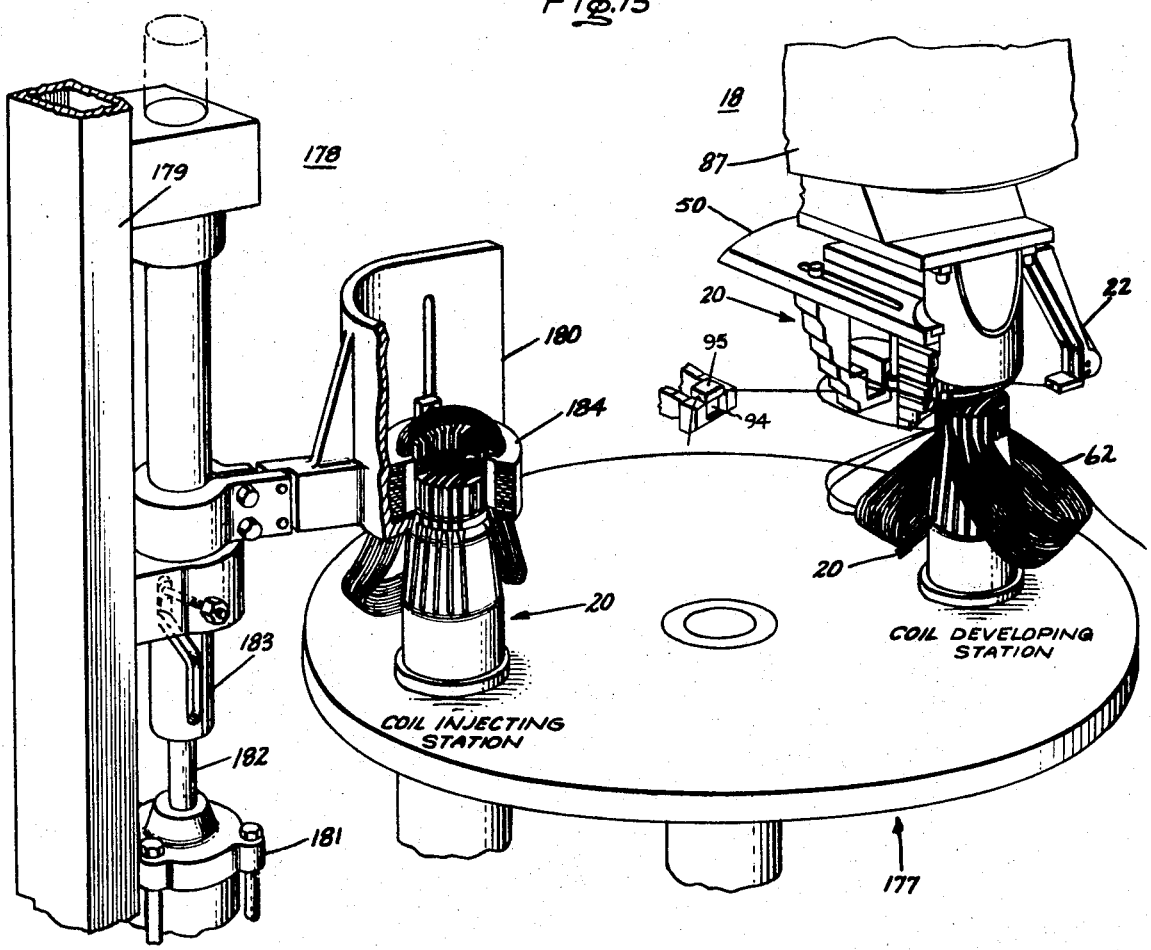
FIG. 13 is a view in perspective of a machine wherein the improved apparatus is mounted on a turntable to illustrate how the coil group accommodating means with the coil groups wound thereon can be indexed to a coil injecting station where the coil groups are axially inserted directly from the coil group accommodating means into the slots of a stator core.
Figure 12:
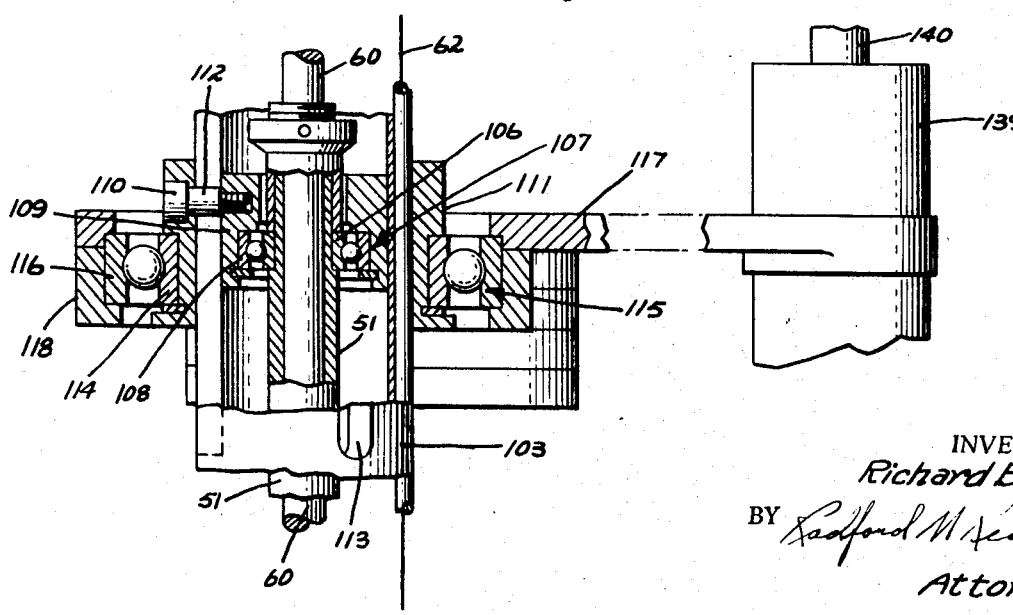
FIG. 12 is a sectional view of the jump arm assembly illustrating how translational movement is imparted to the jump tube.

Having more specific reference now to FIGS. 1 through 10, I will now describe the improved coil developing apparatus 18 and more specifically the winding head 19 shown in FIGS. 1 and 2 with a preferred coil group accommodating means or device in the form of coil injection tooling 20 in position under the winding head 19.

The winding head 19 includes a noncollapsible coil turn-forming assembly 21, winding means in the form of a flyer 22, a wire cutter and holder 23 and a stripper 24. In this illustrated embodiment of the invention, the winding head 19 is adapted to generate the turns for a coil group comprising up to five serially connected coils of electrically conductive wire. Each coil may be one or more turns of wire and normally will be several such turns. The coils, as will hereinafter be more fully explained, are formed in the coil group accommodating means 20 as the individual turns are generated on the coil turn-forming assembly 21. As the individual turns are generated they are stripped off the coil turn-forming assembly 21 essentially by the last wound turns forcing the previously wound turns downwardly into one of the five turn receiving slots 25, 26, 27, 28 and 29 (see FIG. 5) of the coil group accommodating device 20. Also, the stripping of the turns is aided by the force of gravity. The coil receiving slots 25, 26, 27, 28 and 29 are defined by spaced curved blades 30, 31, 32, 33 and 34. A more detailed description of one coil group accommodating device that may be used in conjunction with the winding head 19 is presented in my copending application Ser. No. 875,895 assigned to the same assignee as the present application which copending application is a continuation-in-part of my earlier application, Ser. No. 748,405, which earlier application is now abandoned but was copending with application Ser. No. 875,895 and was filed the same day as the parent application Ser. No. 748,406 of the present application.

Coil turn-forming assembly 21 includes a jump form portion 35, with a midform section 36 and a back-form section 37, and a snap out form portion 38. As is best seen in FIG. 5, the snap out portion 38 includes a plurality of guides or guide means in the form of snap out winding form plates 39, 40, 41, 42 and 43 which are biased to extended positions (downwardly in FIG. 7) by springs 44, 45, 46, 47 and 48. The back-form section 37 and the midform section 36 are supported on a jump plate 50 attached to a jump tube 51. The back-form section 37 is adjustably mounted in two elongated slots 52, 53 (see FIG. 6) of the jump plate 50 so that the back-form section 37 can be moved relative to the midform section 36 to allow the coil turn lengths to be adjusted by increasing or decreasing the spacing between the turn-gauging steps 54, 55, 56, 57 and 58 on the back-form section 37 and midform section 36. In order to permit the back-form section 37 to accommodate relatively short turn lengths, the back-form section 37 is provided with an opening 59 so that it can pass over the stripper 24 and stripper actuating shaft 60.

In this exemplification of the invention, the midform section 36 and back-form section 37 define five turn-gauging steps 54, 55, 56, 57 and 58 which are interrupted at the side of the midform section 36 adjacent to the snap out form portion 38. The turn-gauging steps 54, 55, 56, 57 and 58 are arranged so that the turns for the coil with turns of shortest length are generated initially and turns for coils having greater turn lengths are then successively generated. It will be seen in FIG. 5, that each of the turn-gauging steps 54, 55, 56, 57 and 58 are formed with an adjacent bevel 61 that is approximately 45° in the exemplification of my invention. Also, it will be noted that each of the turn-gauging steps is pitched at a slight angle, preferably in the order of 3° on the midform section, to facilitate the downward movement of the turns. The flyer 22 is aligned so that the wire 62 fed by the flyer 22 will strike the bevel 61 of the steps thereby effecting a downward movement that will cause a force to be exerted against any turns previously wound. In this manner the turns are effectively pushed downwardly into the coil receiving slots 25, 26, 27, 28 and 29 of the coil injection tooling 20 or other coil receiving or coil group accommodating device, to develop the coils in the slots. Also, because of the vertical disposition of the steps, the removal of turns from the steps is aided by the force of gravity without need for collapsing any of the winding form components.

The midform section 36 differs from the back-form section 38 in that it has a cutout portion 63 which defines the interruptions in the steps 54, 55, 56, 57 and 58 and accommodates the snap out winding form portion 38. The midform section 36 is also formed with an axially extending opening 64 (see FIG. 10) to accommodate the movement of the stripper 24 and stripper actuating shaft 60.

As is best seen in FIG. 5, a trip plate 65 is located at the top of the midform section 36, and as the midform section 36 is lowered, it successively engages the four latch pawls 67, 68, 69 and 70 (see FIGS. 6 and 7) to release the snap out winding form plates 40, 41, 42 and 43. The first snap out winding form plate 39 does not have a latch pawl release but is spring biased into position when the jump tube 51 positions the first turn-gauging step 54 in the path of the wire 62.

Referring more specifically to FIGS. 5 through 9, I will now specifically describe the various parts of the snap out form portion 38 of the noncollapsible coil turn-forming assembly 21. It will be appreciated that the snap out form portion 38 does not move with the jump plate 50. The snap out form portion 38 includes a housing 72 and the five snap out winding form plates 39, 40, 41, 42 and 43. As will be seen in FIG. 9, the snap out winding form plate 43 has a pair of spaced pins 73 and 74 that engage mating holes 75 and 76 formed on the top of curved blade 34 of the coil injection tooling 20. It will be seen that the snap out winding plate 43 has a fill-in form section 77. When the coil turn-forming assembly 21 has been located or jumped to the position where turn-gauging step 54 is in the path of the wire 62 being wound, winding plate 43 is released from its latched position and will be extended by the associated springs 48 to place the fill-in form section 77 in the interruption of the midform 36 and in the path of the wire 62.

When the pins 73, 74 are engaged with the blade 34, the curved surface 78 on the fill-in form section 77 mates with the adjacent curved surface 79 of the blade 34 to provide a smooth passage for the entry of wire 62 into the coil injection tooling 20. Thus the snap out form plates, and particularly their fill-in form portions, provide guides or guide means for leading the generated turns into the coil injection tooling.

As is seen in FIG. 7, the pawls 67, 68 are latched in the openings 80, 81 formed in the snap out winding form housing 72. The other two pawls 69, 70 are on the backside of the housing 72 and cannot be seen in the view of FIG. 7. The four pawls 69, 67, 70 and 68 are positioned at preselected vertical points so that when the turn-gauging steps 55, 56, 57 and 58 are successively positioned in the path of the wire 62 being wound, the latch pawls 69, 67, 70 and 68 are successively tripped to place the snap out winding form plates 40, 41, 42 and 43 respectively in their extended positions.

In this manner, turn-gauging steps 54, 55, 56, 57 and 58 and corresponding snap out winding form plates are successively brought into the path of the wire being wound. Each set of a turn-gauging step and snap out winding form plate, particularly the fill-in form section, provide a form for generating the turn of wire for a particular coil.

It will be seen in FIG. 7 that the snap out winding form plates 39, 40, 41, 42 and 43 are formed with lugs 82, 83, 84, 85 and 86. When the mid and back form sections 36, 37 of the coil form assembly 21 are returned to their initial positions after the coils for a coil group are developed, the lugs 82, 83, 84, 85 and 86 are engaged by the trip plate 65, and the snap out winding form plates 39, 40, 41, 42 and 43 are returned to their retracted positions. The snap out winding form plate 39 is held in its retracted position by trip plate 65 while winding form plates 40, 41, 42 and 43 are latched in their retracted positions by engagement of latch pawls 69, 67, 70 and 68 with housing 72. It will be appreciated that the snap out portion housing 72 is bolted to the drive control housing 87.

In FIG. 8 I have shown a fragmentary sectional view of the trip plate 43, the jump plate 50, the midform section 36, the trip plate 65, and snap out portion housing 72 to illustrate the interrelationships of these parts. It will be seen that the latch pawl 68 is pivotally supported on a pin 88 and is biased outwardly into engagement with the opening 81 of the snap out portion housing 72 by a spring 89 when the snap out plate 43 is in the latched position. When the midform section 36 is lowered, trip plate 65 engages the latch pawl 68 to force its lower edge 68a out of engagement in the opening 81 of the snap out portion housing 72 thereby unlatching the snap out winding form plate 43. The winding form plate 43 then is extended by springs 48 until latch pawl arm 68b engages the edge of opening 81. When the midform section 36 is returned to its initial position upon the completion of the winding of the coils of a coil group, the trip plate 65 will engage the lugs 86 to return the snap out plate 43 to its latched position.

In a similar manner the snap out plates 40, 41 and 42 are unlatched when the trip plate is lowered sufficiently to engage latch pawls 69, 67 and 70. As the midform section is returned to its initial position, the trip plate 65 will engage the lugs 83, 84 and 85 to raise the snap out plates 40, 41 and 42 to their latched positions. The trip plate 65 also will engage lugs 82 to move the snap out plate 39 from the coil injection tooling.

Referring now to FIGS. 3 and 4, I will now more fully describe the wire cutter and holder 23. In the views illustrated therein, the flyer path is indicated by the broken line 90. As viewed in FIGS. 3 and 4, the right-hand portion of the wire 62 extends to the flyer 23, while the left-hand portion of the wire 62 is either a termination portion or extends to the last previously developed coil.

The function of the wire cutter and holder 23 is to hold and cut the wire 62 at preselected points in the winding cycle. The wire cutter and holder 23 includes a support bracket 91, a hook arm 92 pivotally supported by a pin 93 attached to the bracket 91. At one end the hook arm 92 is formed with a hook 94 for engaging the wire 62. The hook 94 includes a cutting edge 95 and when engaged in the cutting block 96 as illustrated in FIG. 3, cutting edge 95 will shear the wire 62. The hook arm 92 is connected at its other end to a clevis 97 attached to the rod 98 of a double-acting pneumatic cylinder 99.

In order to permit adjustments to be made in the holding pressure applied to the wire 62, an adjusting screw 100 is provided. The adjusting screw 100 is supported over the hook arm 92 by means of a plate 101 attached to the bracket 91.

From the above description of the winding head 19, the flyer 22, and wire cutter and holder 23, it will be apparent that certain control functions must be carried out to effect the jumps or movements of the jump form portion 35 in proper sequence, to drive the flyer 22, to operate the wire cutter and holder 23, and to actuate the stripper 24 upon completion of a winding operation. A winding control and drive that is suitable for this purpose is described in application Ser. No. 826,744 filed on Apr. 2, 1969; which is a continuation-in-part application of application Ser. No. 594,462 filed on Nov. 15, 1966; and which is assigned to the same assignee as the present invention.

Having more specific reference now to FIGS. 5, 6, 11 and 12, I will now more fully explain and describe the control and drive for the winding head 19. The stepped vertical movement is imparted to the winding head 19 by the jump tube 51 attached to the jump plate 50. A pair of vertically extending guide rods 102 prevent any rotational movement of the coil form assembly 21. The winding flyer 22 is driven by a spindle 103 which is supported for rotation within the drive and control housing 87 by means of the ball bearings 104 and 105.

It will be seen in the schematic diagram shown in FIG. 11 that the jump tube 51 and the stripper actuating shaft 60 extend through the flyer spindle 103. The stripper actuating shaft 60 is biased in the upward position as shown by a spring 60a. Near the top end of the jump tube 51 an inner race 106 of a ball bearing 107 (see FIG. 12) is secured to the jump tube 51, and the outer race 108 of the ball bearing 107 is attached to an inner sleeve 109. The cap screws 110 connect an outer sleeve 111 with the inner sleeve 109 for rotation with spindle 103. Each cap screw 110 has a shank portion 112 engaged in longitudinally extending slots 113 formed in the flyer spindle 103. It will be noted that the inner race 114 of a second ball bearing 115 is attached to the outer sleeve 111. The outer race 116 is secured to a jump push or yoke plate 117 by an annular retainer 118. With this arrangement it will be appreciated that the jump push or yoke plate 117 can effectively impart a longitudinal movement to the jump tube 51 while the spindle 103 rotates around it. In this illustrative embodiment of my invention, the winding flyer spindle 103 is driven by an electric motor 120 in a one-to-one speed ratio through a pulley system. The pulley system includes pulleys 121, 122, 123 and 124 and belts 125, 126.

The motor 120 is connected to a tape reader 127 by means of the leads 128 and 129. Pulley 122 driven by the motor 120 drives a control shaft 130 which rotates a transparent disc 131 and an eccentric arm 132. Light-impervious mark 133, 134 on the disc 131 interrupt the light from photoelectric cells 135, 136 to provide signals to tape reader 127 indicative of the position of the flyer and the number of revolutions traversed by the flyer. Leads 137 and 138 connect the photoelectric cells 135 and 136 in circuit with the tape reader 127.

It will be noted that the yoke plate 117 is attached to a cylindrical guide member 139 slidably disposed along the rod 140 for limiting the movement of the yoke plate 117 from an upper position where it butts against the support bracket 141 and a lower position where it rests against the shoulder 142. The stepped movement of the jump tube 51 is controlled by a series of four trip bars 143, 144, 145 and 146. A double-acting air cylinder 147 having a rod 148 attached to the yoke plate 117 normally during winding biases the yoke plate 117 in a downward direction. The trip bars 143, 144, 145 and 146 are pivotally supported on a bracket 149 and are normally held in a hold position for engagement with the yoke plate extension 150 by springs 151, 152, 153 and 154. The trip bars 143, 144, 145 and 146 are moved out of the hold position by means of an oscillating mechanism 155 having four pins 156, 157, 158 and 159 which are movably carried in a rocker arm 160 driven by the eccentric arm 132. Bell cranks 161, 162, 163, and 164 operatively connected to solenoids 165, 166, 167 and 168 move a pin under its associated trip bar whenever a solenoid is energized. The solenoids 165, 166, 167 and 168 are connected with the tape reader 127 by means of the electrical leads 169, 170, 171 and 172. When a pin is extended and engages a trip bar, the trip bar will pivot out of the stop position, and the yoke plate 117 will jump or move into engagement with the next trip bar. It will be appreciated that so long as the pins 156, 157, 158 and 159 remain in their retracted positions, the oscillatory movement of the eccentric arm 132 does not have any effect on the trip bars, since the pins make no contact with the bars.

In order to ensure that all the turns have been moved off the turn-generating forms upon completion of the turn-generating operation, the stripper 24 is actuated by an air cylinder 174. A rod 175 of the air cylinder 174 is actuated in response to a signal from the tap reader 127 and strikes a strike plate 176 attached to the stripper shaft 60 and moves the stripper 24 downwardly. As the stripper 24 moves in the downward direction, the spring 105 is compressed, and the strike plate 176 and stripper 24 are returned to their initial positions by means of the spring 105 when the coil turn stripping operation is completed.

In FIG. 13 I have illustrated a coil developing apparatus 18 as applied to a turntable 177 with the winding and coil injecting stations being shown. After the first coil group is developed, the coil injection tooling is rotated 180° by the gears 187, 188 (see FIG. 1) to place the other set of turn receiving slots under the snap out plates 39, 40, 41, 42 and 43. When the second coil group is developed by the apparatus 18, the turntable 177 is indexed to place the coil injection tooling 20 with the two coil groups in position at the coil injection station while the other coil injection tooling is moved over to the winding station.

The coil injection tooling 20 is illustrated with the longitudinal axes of the curved blades 30—34 disposed generally vertically and with the coil turn-forming assembly 21 positioned above the coil injection tooling. Such an arrangement is not necessary and other dispositions of these parts can be utilized. It will be realized that, to obtain any substantial assistance from the force of gravity in moving generated turns into the turn receiving slots, the coil accommodating device should be positioned, at the coil developing station, with the longitudinal axes of the curved blades nonhorizontal and with the distal ends of the blades positioned generally upward.

At the coil injecting station, a core clamping and positioning assembly, generally identified by reference numeral 178 is provided. The core clamping and positioning assembly 178 includes a main vertical frame 179, a clamping arm 180, a double-acting cylinder 181 having a rod 182 attached to a cylinder cam 183. As will be seen in FIG. 13 the rectilinear motion of the rod 182 is converted by the cylinder cam 183 on which the clamping arm 180 is supported to requisite vertical and horizontal movements necessary to lift a stator 184 clamped in the clamping arm 180 from juxtaposition to coil injection tooling 20 and to swing the arm 180 angularly away from the turntable 177, when the arm 180 is axially removed from the coil injection tooling, where the stator 184 can be conveniently removed by an operator.

Having more specific reference now to FIGS. 1, 2, 5, 11 and 13, I will now more fully describe a cycle of operation of the improved coil developing apparatus 18.

When the coil injection tooling 20 is located in position under the coil turn-forming assembly 21, the jump cylinder 147 positions the push plate 117 so that the extension 150 butts against the first trip bar 143. This causes the first snap out winding form plate 39 to be engaged by spring pressure against the first curved blade 30 of the coil injection tooling 20 and the first turn-gauging step 58 to be positioned in the path of the wire 62. The flyer 22 now starts rotating to generate turns of wire on the first turn-gauging step 54, including the fill-in form portion of winding form plate 39. After approximately three turns are generated, the start end of the wire 62 can be released from the wire cutter and holder 23. The number of turns generated about the first turn-gauging step 54 of the coil turn-forming assembly 21 is determined by the punched tape of the tape reader 127. As the turns of wire are generated around the turn-gauging step 54, including the snap out winding form plate 39, they tend to slide downwardly (as seen in FIG. 1) and enter the turn receiving slot 25. The first coil is actually formed in the turn receiving slot 25.

With the turn count for the first coil completed, the pin 156 is extended by solenoid 115 to cause the push plate 117 to engage the second trip bar 144. The second snap out winding form plate 40 is now unlatched, and the second turn-gauging step 55 is in the path of the wire 62. The second snap out winding plate 40 is held against the curved blade 31 of the coil injection tooling 20 by spring pressure. Also, the pair of pins at the end of the second snap out winding form plate 40 are engaged in the mating holes in the curved blade 31 to maintain the second snap out winding form plate 40 rigidly in alignment therewith. When the predetermined number of turns have been generated to complete the second coil in coil receiving slot 26 of the coil injection tooling 20, solenoid 166 is energized by the tape reader to cause trip pin 157 to be extended. The extension 150 of the push plate 117 engages the third trip bar 145 thereby causing the jump form portion 35 to be lowered and unlatch the third snap out winding form plate 41.

Similarly, after a predetermined number of turns have been generated to complete the winding of the third coil, solenoid 167 is energized by the tape reader 127 to cause the extension 150 of push plate 117 to engage the fourth trip bar 146. The turn-gauging step 57 with the fourth snap out winding form plate 42 is now in the path of the turns generated from the wire 62, and the turns for fourth coil of the coil group are generated.

Upon completion of the fourth coil, solenoid 168 is energized by the tape reader 127 to effect the fifth jump and place the fifth turn-gauging step 58 and its associated snap out winding form plate 43 in the path of the wire 62 being wound by the flyer 22 thereby to generate the turns for the fifth and last coil of the coil group. It will be appreciated that as the flyer 22 rotates around a turn-gauging step, the wire 62 is laid on the bevel 61 of a turn-gauging step. Thus, each turn of wire as it is placed on the winding form by the flyer pushes the preceding turns into the coil receiving slots of the insertion tooling 20. Also with the nonhorizontal positioning, gravity assists in moving the turns into the slots 25—29.

Thus, snap out winding form plates 40, 41, 42 and 43 are successively unlatched as the jump form portion 35 is lowered to place the progressively larger turn-gauging steps 55, 56, 57 and 58 in the path of the wire 62. In the exemplification of the invention, the tape reader 127 not only controls the turn count of the coils being developed but also preferably controls the number of the slowdown turns included at the end of the total turn count for the fifth coil. It will be appreciated that a slowdown of the flyer speed is required in order to allow the wire cutter and holder 23 to be brought into the wire path during the last turn and also to permit control of the wire location. A signal indicating the rotational position of the flyer head is provided by means of the tape mark 134 on the translucent disc 131. Also, at the end of the total turn count of the fifth coil, the wire stripper 24 is actuated by the stripper air cylinder 174 and not only clears the coil turn-forming assembly 21 of any turns that may not have moved off but also pushes the turns into the coil turn receiving openings of the coil injection tooling 20 sufficiently so that they will not spring out.

After the first group of coils have been developed in the tooling (the first group of coils being the first pole of a two pole stator in this exemplification of the invention), the snap out winding form plates 39, 40, 41, 42 and 43 are returned to their retracted positions. The coil injection tooling 20 is then indexed into position by rotating it 180° to receive the turns for the coils of the second pole. The turns for the coils of the second pole are generated in essentially the same sequence as the coils of the first coil group and are received in appropriate slots in the coil injection tooling to develop the coils. When the coils of the second coil group are wound and the coil turn-forming assembly 21 and the stripper 24 moved to their initial positions, the coil injection tooling containing the two coil groups is moved to an injection station, as shown in FIG. 13, where the coil groups are axially inserted into the slots of the stator 184.

From the foregoing description it will be apparent that the snap out winding form plates cooperate with the curved blades of the coil injection tooling to guide or effect a transfer of the turns for each coil as they are being generated directly into the coil injection tooling. This provides the important advantage that the coils can now be directly inserted into a stator core of an electric motor using only one coil form assembly and one coil injection tooling. In collapsible arbor-type machines it has been proposed that a collapsible arbor be provided for each coil group, thus for four pole stators, four arbors are needed. Further, unnecessarily long interpole wire lengths result. Another advantage of the improved snap out winding form arrangement is that the coil injection tooling does not have to be lowered or raised into position to receive the turns from the winding apparatus and the overall size is not that large. In collapsible arbor-types of machines each of the turn-gauging steps must be sufficiently large to accommodate all of the turns of a coil of maximum size. It is possible to use the apparatus of the present invention where the coil injection tools are mounted on a conveyor, whether a rotary indexing table or an in-line type of arrangement, and it will be apparent also that the snap out winding form arrangement is readily adapted to semiautomated type of production. Further, the coil developing apparatus is capable of winding a wide range of diameter wire sizes. Apparatus was constructed in accordance with the embodiment of the invention illustrated in FIGS. 1- —13, which was capable of developing coils in coil injection tools, the wires having a diameter size ranging from 0.010 to 0.0508 of an inch without need for changing the openings in the tools. Further, unlike prior art devices, there is little tendency for the turns to become jammed or crossed-over as the turns are being deposited into the tools, thereby reducing if not entirely eliminating potential interference with a subsequent smooth transfer of the turns from the tools into selected slots of a magnetic core. Other benefits result from a short period of time employed for the combined developing and injecting operations permitted by the present invention, the lack of need for collapsible winding arbors, which correspond in number to the magnetic poles of the core, and the usual related inherently expensive components, and the high level of production efficiency attainable using the present invention.

Although in the illustrated exemplifications of my invention, I have shown a coil injection tooling for accommodating the coil groups of a two pole stator, it will be appreciated that the improved coil developing apparatus is readily adapted for developing windings for magnetic cores having in excess of two poles. For instance, when a coil developing apparatus is used to wind four coil groups into coil injection tooling, the tooling is sequentially rotated or turned three times through 90° to locate the tool at the proper position for receiving the turns of the coil groups. In addition, although a latching arrangement for releasing five snap out winding form plates was illustrated, it will be understood that, depending upon the number of coils to be wound, more or less than five snap out winding form plates may be employed in the practice of one form of the invention.

Further, if desired the individual wire turn lengths in a given coil may be readily varied merely by gradually or progressively changing the distance between winding forms in the noncollapsible form assembly as the turns are being developed into coils in the tool. For instance, back-form 37 may be mounted to be moved gradually toward or away from midform 36 by a screw feed or the like. Thus, by regulating movement and direction of the feed, the turns may be progressively shortened, lengthened or both in the same coil, as dictated by the slot configuration of the magnetic core during coil development in the tools or other slotted coil group accommodating member.

Figure 14:
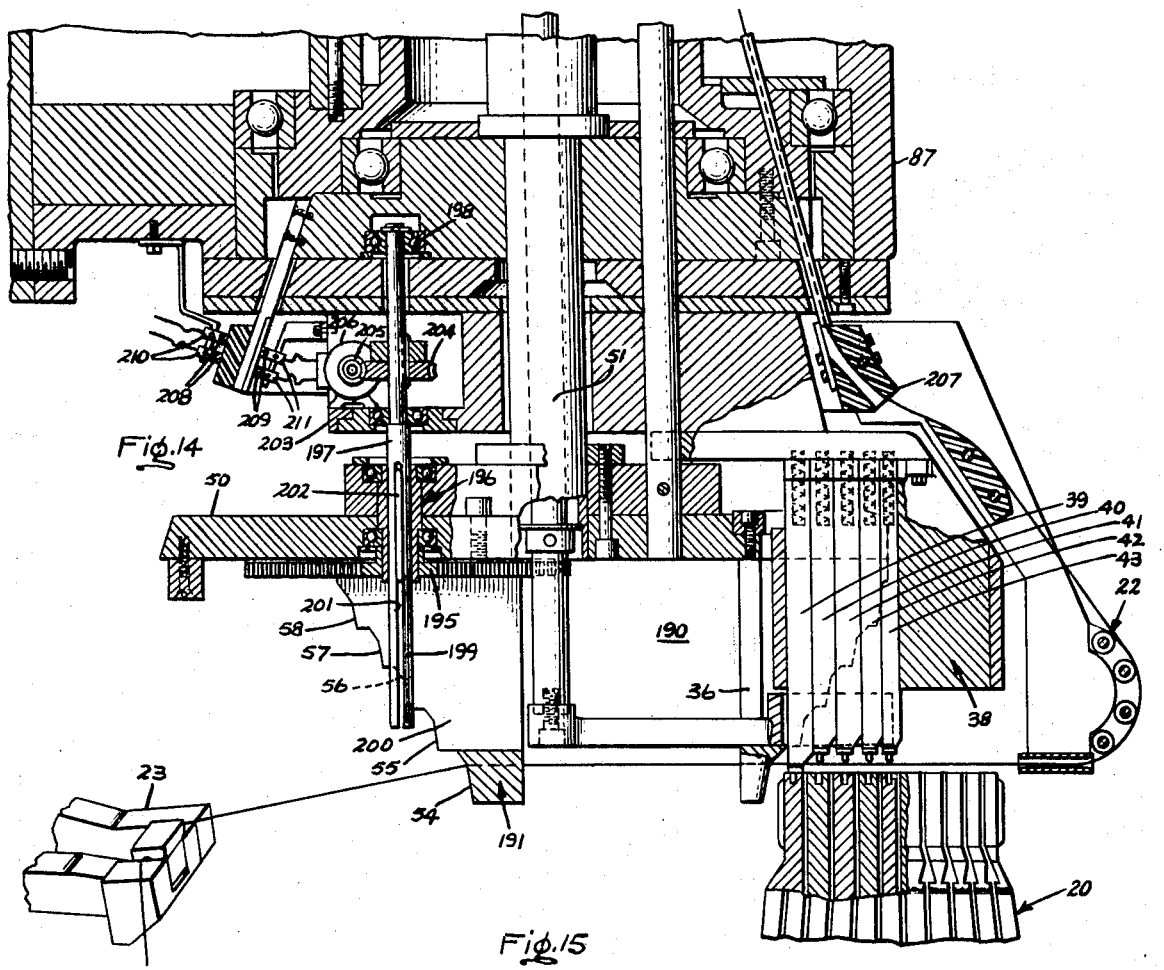
FIG. 14 is an enlarged side elevational view similar to FIG. 5, but illustrating a coil turn-forming assembly incorporating another embodiment of the invention in which the back-form section is movable relative to the snap out winding form portion during turn generation.
Figure 15:
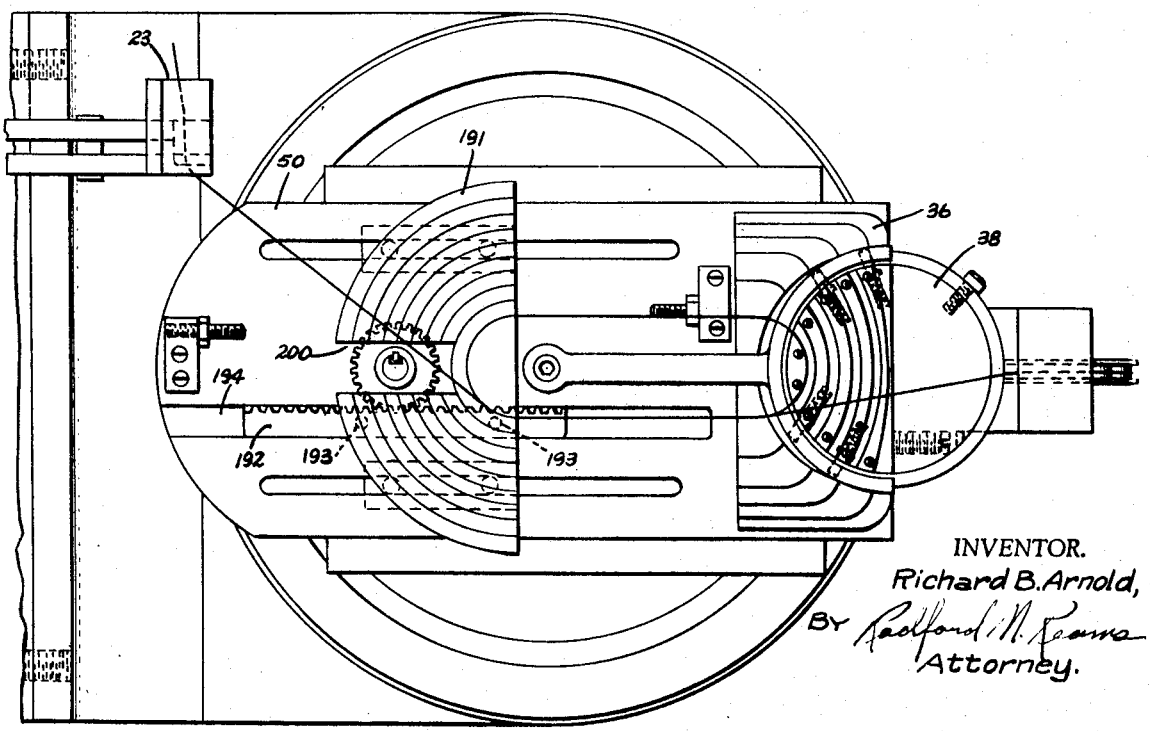
FIG. 15 is a bottom plan view of the coil turn-forming assembly shown in FIG. 14 without any sectionalization of the parts and without the coil group accommodating means being shown.

Referring now to FIGS. 14 and 15 in particular, there is illustrated certain details of a coil turn-forming assembly 190 which is basically similar to the coil turn-forming assembly 21, of FIGS. 1—13, but has been modified somewhat in order to selectively vary the length of turns being generated for a predetermined coil or coils. The snap out form portion 38 is the same, and the midform section 36 of the jump form portion is the same; however, the back-form section 191 has been modified. A rack 192 is attached to the back-form section 191 by some suitable means such as small bolts 193, and the rack is received in a slot 194 in the jump plate 50. A pinion gear 195 is supported on the jump plate 50 by means of a bearing structure 196 and has teeth meshing with the teeth of the rack 192. Thus, as the pinion gear 195 is rotated in opposite directions, it will move the rack to the right or the left (as seen in FIGS. 14 and 15) and the rack will carry the back-form section 191 with it.

In order to selectively rotate the pinion gear, and thus move the back-form section, a shaft 197 is provided with its upper end mounted in the drive control housing 87 by a bearing structure 198. The lower end 199 of the shaft is received in a slot 200 in the back-form section and includes a longitudinally extending keyway 201. The keyway cooperates with an elongated key 202 formed in the bearing 196 so that as the shaft rotates the bearing 196, and thus pinion gear 195, will be rotated. The jump tube 51 can move the coil turn-forming assembly 190 longitudinally (up and down in FIGS. 14 and 15) without moving the shaft 197 longitudinally as the key 202 and keyway 201 are relatively movable in their axial direction. Within the drive control support structure 203, the shaft is connected to a worm gear 204 and the worm gear in turn is connected to the drive shaft 205 of a small electrical motor 206. The motor is mounted to a stationary portion of the support structure 203.

In order to provide electrical energy to the motor, the flyer mechanism 22 includes a rotary sleeve 207 having a first set of slip rings 208 provided on its outer surface and a second set 209 provided on its inner surface, these slip rings being electrically interconnected through the sleeve. A pair of brushes 210 are mounted in engagement with the outer slip rings 208 and may be connected to a suitable source of electrical energy while a second set of brushes 211 are connected to the inner slip rings 209 and are also connected to the motor 206. Thus at appropriate and predetermined times the motor 206 may be energized to rotate the shaft 197 and thus the pinion gear 195. This rotary motion of the pinion gear is translated to rectilinear motion of the rack 192 which carries with it the back-form section 191.

As the back-form section 191 moves to the right or left (as seen in FIGS. 14 and 15) the distance between its turn-gauging steps 54—58 and the corresponding snap out winding form plates 39—43 is varied. This effectively varies the circumference of the form about which the turns of wire are being generated and thereby selectively varies the length of successive turns. Since the shaft 197 may be rotated independently of the remaining portion of the turn-forming assembly 190, the spacing may be varied during a turn-generating operation and thus vary the length of successive turns generated for an individual coil. Motor 206 also may be utilized to move back-form section 191 before a turn-generating operation begins so as to set different coil lengths for the turns of successively generated coil groups.

It will be realized that when the back-form section 191 is moved to the left (as seen in FIGS. 14 and 15) during turn generation to increase the length of successively wound turns, care must be taken both as to the speed which the back-form section is moved and the pitch of the turn-gauging steps to ensure that previously generated turns will move off of the turn-generating assembly into associated turn receiving slots of the injection tooling and will not bind on the turn-gauging steps.

While the invention has been explained by describing various embodiments thereof, it will be apparent that many modifications may be made without departing from the spirit of the invention. It is therefore intended to cover all such equivalent variations as come within the scope of the appended claims.

I claim:

1. Apparatus for developing at least one coil of electrically conductive wire for use in a magnetic core, said apparatus comprising: a coil turn-forming assembly including a jump form portion and a snap out form portion; said jump form portion having a plurality of turn-gauging steps, each of said turn-gauging steps having an interruption formed at one side thereof; said snap out form portion having a plurality of snap out winding form plates supported adjacent to the interruptions of said turn-gauging steps; each of said snap out winding form plates having a fill-in form section for spanning a corresponding one of said interruptions; flyer means for generating turns of wire about said coil turn-forming assembly; jump means for locating a predetermined one of said turn-gauging steps in the path of the turns being generated; means for concurrently extending a corresponding one of said snap out winding form plates to place a corresponding one of said fill-in form sections in alignment with the interruption of said one turn-gauging step; said one turn-gauging step and said one fill-in form section cooperating to provide a form for generating the turns of the at least one coil; and coil injection tooling comprised of a plurality of elongated, spaced apart curved blades defining coil receiving slots; said spaced apart curved blades and said fill-in form sections of said snap out winding form plates having curved surfaces which mate, when said snap out winding form plates are extended, for guiding into said coil receiving slots the turns generated about said coil turn-forming assembly.

2. The apparatus as set forth in claim 1, wherein a stripper is positioned adjacent said snap out winding form plates to push any remaining turns off the fill-in form sections and turn-gauging steps upon completion of the generation of the turns of the at least one coil.

3. Apparatus for developing a plurality of coils of conductive wire for use in a magnetic core, said apparatus comprising: a coil turn-forming assembly including a jump form portion and a snap out form portion; said jump form portion having a plurality of turn-gauging steps, each of said turn-gauging steps having an interruption formed at one side thereof; said snap out form portion having a plurality of guide means, each of said guide means being positioned for effectively spanning the interruption of a corresponding turn-gauging step; flyer means for generating turns of wire about said coil turn-forming assembly; jump means for locating said turn-gauging steps in the path of the wire generating the turns; trip means for concurrently positioning corresponding guide means in alignment with the interruptions of said turn-gauging steps; said turn-gauging steps and said corresponding guide means cooperating to provide forms for generating the turns of the plurality of coils; control means for actuating said jump means to successively place a predetermined other turn-gauging step in the path of the wire generating the turns subsequent to the completion of the turns of wire for each coil; said trip means concurrently positioning successive corresponding guide means in alignment with the interruption of each such turn-gauging step; and coil group accommodating means supported in alignment with said snap out form portion; said coil group accommodating means including a plurality of blades spaced-apart to form coil receiving slots; each of said blades being positioned to be engaged by a corresponding guide means when said corresponding guide means is positioned in alignment with its corresponding turn-gauging step; whereby the turns for each of the coils are successively generated about a corresponding turn-gauging step and guide means and received in a corresponding coil receiving slot so that the coils are formed directly in said coil group accommodating means.

4. The apparatus as set forth in claim 3 further including means for moving at least part of said jump form portion relative to said snap out form portion during generation of the turns for selectively varying the lengths of the turns of selected coils.

5. Apparatus for developing at least one coil of electrically conductive wire for use in a magnetic core, said apparatus including: coil injection tooling having means for inserting the at least one coil into the magnetic core and further having a plurality of elongated, spaced-apart blades forming turn receiving slots therebetween; said blades being positioned with their longitudinal axes nonhorizontal and having distal ends positioned generally upward; a coil turn-forming assembly; winding means for generating turns of wire about said coil turn-forming means; said coil turn-forming assembly including guide means in axial alignment with at least one of said blades to guide generated turns of wire into at least a corresponding one of said turn receiving slots during the turn-generating operation for forming the at least one coil directly in said coil injection tooling.

6. The apparatus as set forth in claim 5 wherein said coil turn-forming assembly includes means for selectively varying the lengths of successive turns during the turn-generating operation.

7. The apparatus as set forth in claim 5 wherein said coil turn-forming assembly includes a jump form portion and a snap out form portion; said jump form portion having a plurality of turn-gauging steps having an interruption formed at one side thereof; said snap out form portion having a plurality of guide means, each of said guide means being positioned for effectively spanning the interruption of a corresponding turn-gauging step; jump means for locating a predetermined turn-gauging step of said jump form portion in the path of the turns being generated; and trip means for concurrently positioning a corresponding guide means in the interruption of said predetermined turn-gauging step; said corresponding guide means thereupon engaging the distal end of a corresponding one of said blades.

8. The apparatus as set forth in claim 7, further including control means for actuating said jump means to successively place other predetermined turn-gauging steps in the path of the turns being generated; said trip means concurrently positioning successive corresponding guide means in alignment with the interruption of each such turn-gauging step; each such guide means thereupon engaging the distal end of a corresponding one of said blades for successively developing directly in said coil injection tooling a plurality of coils from a continuous strand of wire.

9. The apparatus as set forth in claim 8 further including means for providing relative motion between at least part of said turn-gauging steps and said guide means during turn generation for selectively varying the lengths of the turns of at least one of the coils.

10. The apparatus as set forth in claim 7 wherein each of said guide means is a snap out winding form plate having a fill-in form section for spanning a corresponding one of said interruptions; said snap out form portion includes a housing; said snap out plates are slidably disposed in said housing with said fill-in form sections projecting toward said coil injection tooling; at least one of said snap out winding form plates is spring biased to an extended position and is latched in a retracted position; and said jump form portion includes a trip plate for releasing said at least one snap out winding form plate as said jump means locates a corresponding turn-gauging step in the path of the turns being generated.

11. Apparatus for providing at least a coil of electrically conductive wire in a magnetic core, said apparatus including:

coil injection tooling having a plurality of elongated spaced-apart blades forming turn receiving slots therebetween; said blades being mounted with their longitudinal axes nonhorizontal and having distal ends positioned generally upward; conveyor means for moving said coil injection tooling between a coil developing station and a coil injecting station; said coil developing station including a coil turn-forming assembly and winding means for generating turns of wire about said coil turn-forming assembly; said coil turn-forming assembly including guide means in axial alignment with at least one of said blades, when said coil injection tooling is at said coil developing station, to guide generated turns of wire into at least a corresponding one of said turn receiving slots during the turn-generating operation for forming said at least one coil directly in said coil injection tooling; said coil injecting station including a core clamping and positioning assembly to position a slotted core in juxtaposition to said coil injection tooling, when said coil injection tooling is at said coil injecting station, for insertion of the at least one coil from said coil injection tooling into the core.

12. The apparatus as set forth in claim 11 wherein said core clamping and positioning assembly is axially movable relative to said coil injection tooling and angularly movable when axially removed from said coil injection tooling.

13. Apparatus for developing at least one coil of electrically conductive wire for use in a magnetic core, said apparatus comprising: a coil turn-forming assembly including a jump form portion and a snap out form portion; said jump form portion having a plurality of turn-gauging steps, each of said turn-gauging steps having an interruption formed at one side thereof; said snap out form portion having a plurality of snap out winding form plates supported adjacent to the interruptions of said turn-gauging steps; each of said snap out winding form plates having a fill-in form section for spanning a corresponding one of said interruptions; flyer means for generating turns of wire about said coil turn-forming assembly; jump means for locating a predetermined one of said turn-gauging steps in the path of the turns being generated; means for concurrently extending a corresponding one of said snap out winding form plates to place a corresponding one of said fill-in form sections in alignment with the interruption of said one turn-gauging step; said one turn-gauging step and said one fill-in form section cooperating to provide a form for generating the turns of the at least one coil; and coil group accommodating means having a plurality of curved blades spaced-apart to form turn receiving slots; said curved blades being positioned for engagement by said snap out winding form plates when said snap out winding form plates are in their extended positions.